R. B. BENJAMIN.
ELECTRIC FIXTURE.
APPLICATION FILED MAR. 3, 1919.
1,404,733.
Patented Jan. 31, 1922.
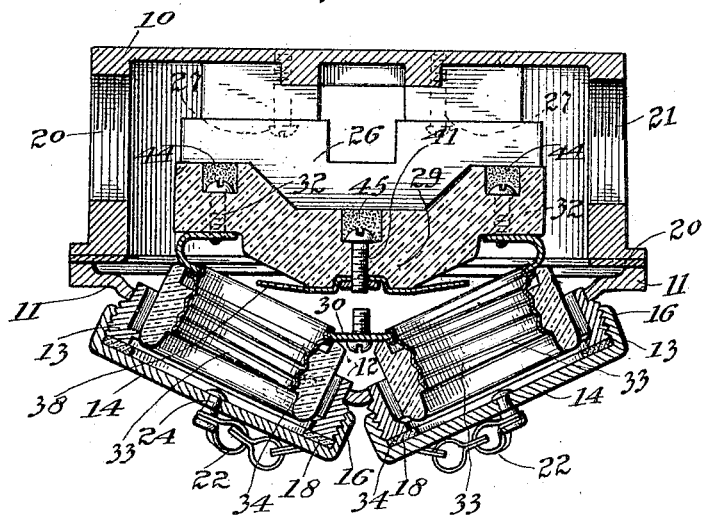

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

ELECTRIC FIXTURE.

1,404,733.   Specification of Letters Patent.   Patented Jan. 31, 1922.

Application filed March 3, 1919. Serial No. 280,381.

*To all whom it may concern:*

Be it known that I, REUBEN B. BENJAMIN, a citizen of the United States, residing at Chicago, in the county of Cook and State of Illinois, have invented new and useful Improvements in Electric Fixtures, of which the following is a full, clear, concise, and exact description, reference being had to the accompanying drawing, forming a part of this specification.

The present invention relates to electric fixtures wherein a plural lamp socket is combined with a connecting block and preferably located within a waterproof box or casing. One of the principal objects of the invention is to provide an outlet box which affords a durable waterproof device of this type. The invention consists in novel arrangements and organizations of parts which will be particularly pointed out in the appended claims. For a full understanding of the invention reference should be had to the following detailed description taken in connection with the accompanying drawing in which I have illustrated a preferred embodiment of my invention.

In said drawings, Fig. 1 is a central vertical section of an electric fixture constructed in accordance with the present invention; Fig. 2 is a side elevation of the plural lamp socket structure removed from the enclosing box or casing; Fig. 3 is a plan view of the same viewed from the lamp side; Fig. 4 is a sectional view taken on a plane indicated by the line A—B of Fig. 2; and Fig. 5 is a transverse vertical section taken on a plane indicated by the line C—D of Fig. 2. Throughout these views like characters refer to like parts.

Referring to the drawing in detail, 10 designates the casing which is open on one side. This casing is composed of iron, brass, or other suitable metal and its open side is closed by a cover 11 which is constructed with a central protruding portion 12. On the opposite sides of this protruding portion are exteriorly threaded annular flanges 13. These flanges extend outward from cover 11 in divergent directions as clearly illustrated. Caps 14 having cooperating flanges 16 are employed to close the openings in the cover 11, provided through annular flanges 13. The interior threads on the cap flanges 16 cooperate with the exterior threads on the annular flanges 13 to bring about a tight closure. Interposed washers 18 make the connection a waterproof one. The cover 11 may be secured to the casing 10 in any suitable way. An interposed washer 20 of rubber or other suitable waterproof material provides a waterproof connection between the two. The casing is provided with tapped openings 20 and 21 of any desired number for the connection of conduits through which the electrical conductors are adapted to pass. Flexible connections in the form of chains 22, connect the caps 14 to the cover 11 or other fixed part of the structure. These chains may be secured in any preferred manner, as for example, by the headed pins 24 which are secured to the caps by riveting.

The plural lamp socket structure which is located within the enclosure 10 and cover 11, includes a base 26 of suitable insulating material which is secured to the upper side of the casing 10 by any suitable means as, for example, the screws 27 which pass through openings in the base into threaded openings in bosses formed on the inside of the casing 10 as clearly illustrated. In the present instance four screws 27 are employed and these screws pass through the openings 28 in the base 26. Base 26 is provided with a central hump 29 having obliquely disposed inclined faces on its opposite sides. A bridging plate 30 of conducting material extends lengthwise of the base 26 over the hump 29. This plate 30 is angular in outline and has its ends bent back upon themselves as indicated in 31. The ends of the bridging plate 30 are secured in position by screws 32 which extend through openings in the base into engagement with threaded openings in ends of the plate. The inclined portions of the plate 30 which lie on either side of the hump 29 of the base 26 have the socket shell contacts 33 connected to them both mechanically and electrically. These shell contacts are for engagement with the outer contacts of the lamp bases. Bushings or sleeves 34 of insulating material are screwed on to the exterior of the shells 33 and separate them from the surrounding annular flanges 13 of the casing structure. Electrical connection is made with the shell contacts 33 through the bridging plate 30 by means of suitable binding screws. These screws are positioned at different points upon the bridge. A pair of screws 35 cooperate with lugs 36 struck up from the metal of the bridge to make such connections. These screws are located at the center of the bridging plate between the shell contacts 33. In the present embodiment, I also provide one terminal screw 37 at each end of the bridging member 30. In the latter case the screw passes freely into an opening in the base 26.

The center contacts of the lamp sockets are formed by a yielding strip 38 of conducting material which passes over the hump 29 and terminates at its ends at the center contacts of the sockets. At its ends, the strip 38 is spaced from an adjacent face of the base 26 so as to provide a yielding contact. At its center the strip 38 passes into a recess or depression 39 formed in the hump 29 of the base 26. This is crossed by a transverse conducting strap 40. This strap conforms closely to the shape of the sides of the hump 29. Strip 38 and strap 40 are secured together and to the base 26 by the central screw 41 which passes through an opening in the face 46 and through an opening in strip 38 into engagement with a threaded opening with strap 40. The strap 40 constitutes a terminal piece and it is provided with a plurality of binding screws 42, two being located at one end of the strap and two at the other. The strap ends are also turned up as indicated at 43 to provide lugs which assist in attaching the conductors to the adjacent binding screws 42.

In tracing the circuit, it will be seen that current passing into the bridging plate 30 through any of its terminals 35 or 37, will pass at once to the shell contacts 33 and thence to the lamps returning through the center contacts formed by a strip 38 and then through terminal plate 40 and one of the binding screws 42 to the outgoing conductor. When the lamps are removed, the entire casing structure becomes water tight upon screwing the caps 14 home into position upon the flanges 13. When the parts are in assembled position the openings in the base 26 into which the screws have been passed, may be filled with insulating compound as illustrated at 44 and 45.

Fig. 3 shows various possible ways of wiring the block. In this figure, A and B may be the main feed-wires, and there may be three branch circuits led off from the wiring base, C and D indicating one pair of conductors constituting a branch circuit, E and F indicating a pair constituting another branch circuit, and G and H indicating another pair constituting another branch circuit.

I claim:

1. An electric fixture comprising an enclosing casing open at one side, an insulating base located in said casing, a bridging conducting plate spaced from said base and secured at its ends to said base, a plurality of socket shell contacts secured to said bridging plate and extending outward from said base, binding screws on said bridging plate, yielding socket center contacts beneath said shells adjacent to said base, a conducting member for securing said center contacts to said base at a common point, binding screws on said conducting member, a cover for said casing for closing its open side, circular flanges on said cover surrounding and spaced from said socket shell contacts, insulating bushings on said shell contacts, between said contacts and said flanges, caps screwed upon said flanges to close the openings there-through to said shell contacts, and water proof connections between said caps and flanges and between said casing and said cover.

2. An electric fixture comprising an enclosing casing open at one side, an insulating base located in said casing, a bridging conducting plate spaced from said base and secured at its ends to said base, a plurality of socket shell contacts secured to said bridging plate and extending outward from said base, binding screws threaded into said bridging plate at its ends and at an intermediate point, yielding socket center contacts beneath said shell contacts adjacent to said base, a strap of conducting material, means for securing said strap to said center contacts at a common point, binding screws threaded into said strap near its ends, circular flanges on said cover surrounding and spaced from said socket shell contacts, insulating bushings on said shell contacts between said contacts and said flanges, caps screwed upon said flanges to close the openings there-through to said shell contacts, and water proof connections between said caps and flanges and between said casing and said cover.

3. An electric fixture comprising an enclosing casing open at one side, an insulating base located in said casing and removable through said opening, a bridging conducting plate spaced from said base and secured at its ends to said base, a plurality of socket shell contacts secured to said bridging plate and extending outward from said base, a cover for said casing for closing its open side, said cover having circular flanges surrounding and spaced from said socket shell contact, insulating bushings on said shell contact, between said contacts and said flanges, and caps screwed upon said flanges to close the openings therethrough to said shell contacts.

In witness whereof, I have hereunto subscribed my name.

REUBEN B. BENJAMIN.